US009547652B2

(12) United States Patent
McKinion (10) Patent No.: US 9,547,652 B2
(45) Date of Patent: Jan. 17, 2017

(54) SYSTEM AND METHOD FOR VALIDATING REPLICATION OF MUTABLE OPERATIONS PERFORMED ON A FILE SYSTEM OBJECT DURING A MIGRATION

(71) Applicant: NetApp, Inc., Sunnyvale, CA (US)

(72) Inventor: James McKinion, Austin, TX (US)

(73) Assignee: NETAPP, INC., Sunnyvale, CA (US)

( * ) Notice: Subject to any disclaimer, the term of this patent is extended or adjusted under 35 U.S.C. 154(b) by 240 days.

(21) Appl. No.: 14/290,830

(22) Filed: May 29, 2014

(65) Prior Publication Data

US 2015/0347425 A1 Dec. 3, 2015

(51) Int. Cl.
*G06F 17/30* (2006.01)

(52) U.S. Cl.
CPC .............................. *G06F 17/30079* (2013.01)

(58) Field of Classification Search
USPC .................................................. 707/790, 809
See application file for complete search history.

(56) References Cited

U.S. PATENT DOCUMENTS

| 7,747,996 | B1* | 6/2010 | Dice | G06F 9/526 710/200 |
| 8,869,236 | B1* | 10/2014 | Tonogai | H04L 63/08 709/224 |
| 2003/0208500 | A1* | 11/2003 | Daynes | G06F 17/30607 |
| 2006/0117072 | A1* | 6/2006 | McKenney | G06F 17/30578 |
| 2008/0281846 | A1* | 11/2008 | Hoang | G06F 17/30377 |
| 2011/0320734 | A1* | 12/2011 | Revanuru | G06F 12/0842 711/135 |
| 2015/0347425 | A1* | 12/2015 | McKinion | G06F 17/30079 707/809 |

\* cited by examiner

*Primary Examiner* — Kim Nguyen
(74) *Attorney, Agent, or Firm* — Nixon Peabody LLP; Khaled Shami (57) ABSTRACT

Examples described herein provide for determining when individual file system operations are quiesced at a destination before validating a state of the file system object after migration. In one implementation, a metadata parameter is modified for individual file system objects after a set of mutable operations for each file system object is completed. The metadata parameter is recorded and subsequently used to determine when each of the individual file system objects are quiesced at the destination filer. The file system objects that are quiesced can be validated for migration and for implementation of any mutable file system operations that were completed at the source during the migration.

20 Claims, 4 Drawing Sheets

SYSTEM AND METHOD FOR VALIDATING REPLICATION OF MUTABLE OPERATIONS PERFORMED ON A FILE SYSTEM OBJECT DURING A MIGRATION

TECHNICAL FIELD

Examples described herein relate to a network-based file system, and more specifically to a system and method for validating replication of mutable operations performed on a file system object during a migration.

BACKGROUND

Network-based file systems include distributed file systems which use network protocols to regulate access to data. Network File System (NFS) protocol is one example of a protocol for regulating access to data stored with a network-based file system. The specification for the NFS protocol has had numerous iterations, with recent versions NFS version 3 (1995) (See e.g., RFC 1813) and version 4 (2000) (See e.g., RFC 3010). In general terms, the NFS protocol allows a user on a client terminal to access files over a network in a manner similar to how local files are accessed. The NFS protocol uses the Open Network Computing Remote Procedure Call (ONC RPC) to implement various file access operations over a network.

Other examples of remote file access protocols for use with network-based file systems include the Server Message Block (SMB), Apple Filing Protocol (AFP), and NetWare Core Protocol (NCP). Generally, such protocols support synchronous message-based communications amongst programmatic components.

DETAILED DESCRIPTION

Examples described herein provide a system and method for validating a file system object that is changed by a client system during a migration. In validating the file system object, a determination is made that a mutable file system operation applied to a file system object at a source filer is reflected on the file system object at the destination filer, so that the file system object is the same as both source and destination.

Examples described herein further provide for determining when individual file system operations are quiesced at a destination before validating a state of the file system object during or after migration. In one implementation, a metadata parameter is modified for an individual file system object after a set of mutable operations for the file system object is completed. The metadata parameter is recorded and subsequently used to determine when the file system object is quiesced at the destination filer. The file system object that is quiesced can be validated for migration and for implementation of any mutable file system operations that were completed at the source during the migration.

According to an aspect, one or more file system operations that are performed on each of multiple system objects of a file system data set at a source are issued from a client system. The file system operations can be specified while the file system data set is migrated from the source to a destination. The one or more file system operations for each of the multiple file system objects include one or more mutable operations which update either data, metadata, or both data and metadata of a specified file system object of the file system data set at the source. A determination is then made as to when each of the multiple file system objects is quiesced after the one or more mutable operations are performed on that file system object at the source. For each file system object that is determined to be quiesced, a state of the file system object is validated at the destination to reflect replication of the one or more mutable operations that are performed for the file system object at the source.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets) and magnetic memory. Computers, terminals, and network-enabled devices (e.g. portable devices such as cell phones) are all examples of machines and devices that use processors, memory, and instructions stored on computer-readable mediums.

System Overview

Figure 1:
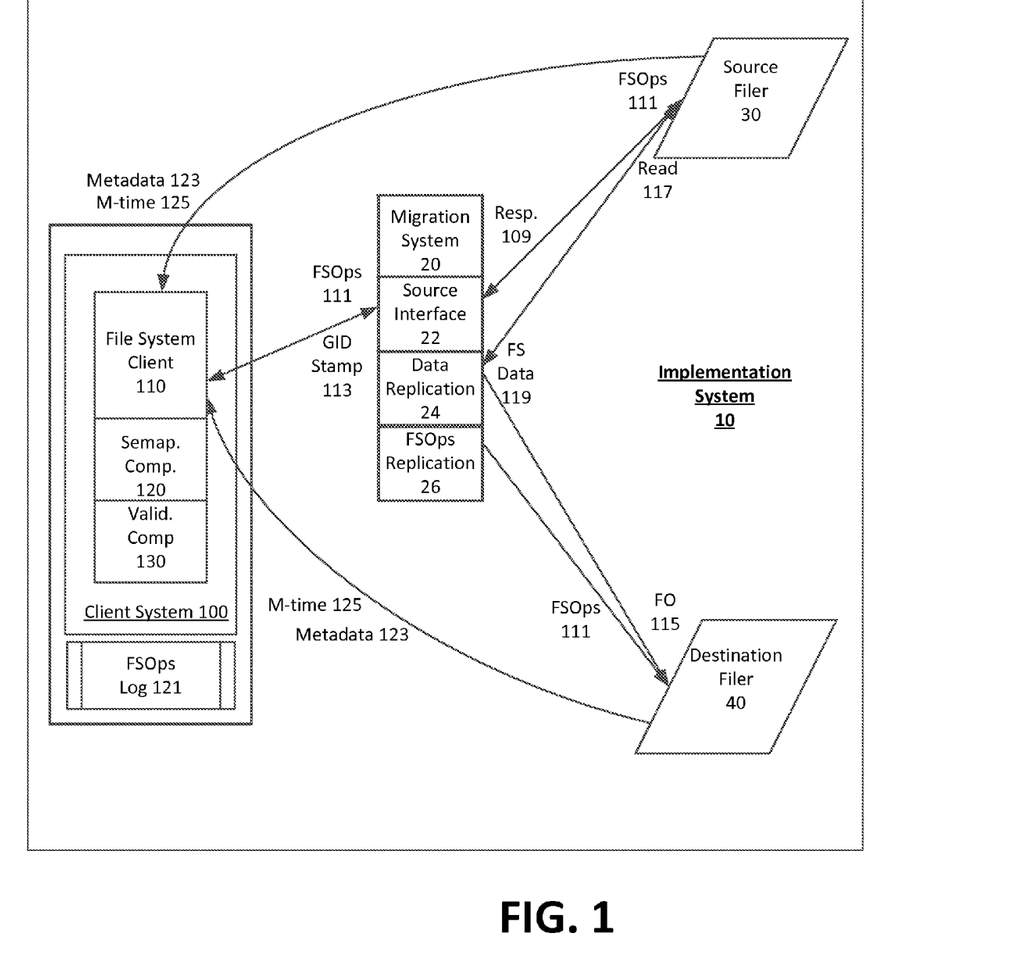
FIG. 1 illustrates an example of a client system that operates to validate replication of mutable operations on file system objects during an active migration.

FIG. 1 illustrates an example of a client system that operates to validate replication of mutable operations on file system objects during an active migration. In more detail, a client system 100 can operate as part of an implementation system 10 which includes a migration system 20 for migrating file system objects from a source filer 30 to a destination filer 40. The implementation system 10 can be provided as part of, for example, a test or evaluation environment for testing/evaluating the performance of the migration system 20. In particular, the implementation system 10 can be used to evaluate the migration system 20 while the source filer 30 is in active use by the client system 100. In FIG. 1, for example, the client system 100 is mounted to the source filer 30, and actively uses the source filer 30 as the migration system 20 migrates data to the destination filer 40.

According to an aspect, the client system 100 includes a file system client 110, a semaphore component 120, and a validation component 130. The file system client 110 operates to issue file system operations 111 for the source filer 30. In one implementation, the file system client 110 communicates via an NFS interface with the source filer 30, and the migration system 20 intercepts operations intended for the source filer 30 in a manner that is transparent to the file system client 110. In one implementation, the migration system 20 operates in-line between the client system 100 and the source filer 30 by (i) receiving and forwarding file system operations 111 specified for the source filer 30, (ii) replicating file system objects of the source filer 30 to the destination filer 40, and (iii) replicating file system operations specified by the client system 100 for the source filer 30 to the destination filer 40. An example of a data migration system is provided with U.S. patent application Ser. Nos. 14/011,696, 14/011,699, 14/011,718, 14/011,719 and 14/011,723; all of which are filed Aug. 27, 2013 and hereby incorporated by reference in their respective entirety.

In an example of FIG. 1, the migration system 20 includes a source interface 22, a data replication engine 24, and a file system operation component 26. The source interface 22 can intercept the file system operations 111 issued by the client system 100 and intended for the source filer 30. The source interface 22 can forward intercepted file system operations onto the source filer 30. The source interface 22 can also selectively queue file system operations that are specified from the file system client 110 for asynchronous performance on the destination filer 40. Specifically, the source interface 22 can queue or otherwise trigger performance, on the destination filer 40, of file system operations that are specified for the source filer 30 and mutable to the contents or metadata of the file system objects. In this way, the migration system 20 can migrate the source filer 30 to the destination filer 40 while the client system 100 continues to access and specify file system operations for the source filer 30.

Further, in an example of FIG. 1, the file system operation component 26 of the migration system 20 can access the queue of the source interface 22 in order to replicate selective file system operations 111 on the destination filer 40, so that changes to the source filer 30 are reflected in the destination filer 40. Thus, the file system operation component 26 can replicate mutable operations specified for the file system objects at the source filer 30 onto the destination filer 40.

The data replication engine 24 operates to replicate file system objects 115 that are not in use on the destination filer 40. For example, the data replication engine 24 can operate to replicate file system objects at the destination filer 40 for file system objects that occupy a portion of the source filer that is not in use by the client system 100. The data replication engine 24 can issue read operations 117 for the source filer 30 in order to obtain file system data 119, from which file system objects can be written to the destination filer 40.

According to one aspect, the client system 100 operates to validate that (i) individual file system objects are successfully migrated from the source filer 30 to the destination filer 40, and further that (ii) mutable file system operations that are specified for migrated file system objects are accurately reflected on the destination filer 40. In performing validation, the client system 100 also determines when individual file system objects are quiesced at the destination 40 so that validation can be performed. In particular, examples recognize that file system objects should be quiesced at the destination in order to validate the migration and state of those file system objects after performance of the mutable operations. Otherwise, if the file system objects are not quiesced at the destination, no such determination can be made, as the file system object is still in flux.

In one example, a validation component 130 of client system 100 receives metadata from each of the source filer 30 and destination filer 40. The validation component 130 can compare a metadata-based parameter of the file system object at each of the source and destination filers 30, 40 in order to determine whether the metadata of the file system object at the source and destination filers match. If the metadata parameter matches, the validation component 130 can deem the file system operation to be quiesced, meaning that the file system object can be validated. Otherwise, the determination resulting from comparison of the metadata parameter is that the file system object has different states at the source and destination filers 30, 40, indicating, for example, that the file system object is still in flux at the source filer 30 and/or not quiesced at the destination filer 40.

Once the file system object is deemed quiesced at both the source and destination filers 30, 40, the state of the file system object at the destination filer 40 can be validated. The validation component 130 can determine whether a state of the file system object at the destination replicates performance of the one or more mutable operations that are performed for the file system object at the source. For example, a comparison of the file system object at the source and destination filer 30, 40 can be made to determine that the contents and/or state of the file system object is the same at both the source and destination filers 30, 40. As an alternative or addition, the comparison of the file system object at the source and destination filers 30, 40 can be based on metadata, such as a user identifier (UID), group identifier (GID), number of links (nlink) permission settings, file size, or m-time. In this way, the validation of the state of individual file system objects to reflect performance of mutable operations at the source filer 30 can be determined from the comparison.

Accordingly, client system 100 retrieves metadata from the file system objects in order to track and verify the completion of file system operations during the migration of the source filer 30 to the destination filer 40. The retrieved metadata is used to determine when the individual file system objects are quiesced. Once the file system object is determined to be quiesced at the destination filer, individual file system objects at the source filer 30 can be compared to counterparts at the destination filer 40 to determine whether the mutable operation performed on the particular file system object was successfully reflected on the file system object at the destination filer 40. This determination can be made while the source filer 30 is in active use with the client system 100.

According to one aspect, the metadata 123 can include time based metadata, specifically modification time (m-time 125), as well as other metadata for determining and implementing a semaphore (e.g., metadata parameter). The m-time 125 can identify when a given file system object is modified. More specifically, a mutable operation to a file system object at the source and 30 may automatically cause an m-time 125 update of the file system object at the source filer 30. While m-time 125 can in some cases provide a mechanism for checking whether a mutable operation to a file system object at the source filer 30 is migrated to the destination filer 40, examples recognize that m-time 125 in and of itself is unreliable in many of the cases where modification is made to a file system object at the source filer 30. For example, not all mutable operations performed on the file system object at the source filer 30 results in a m-time update. Rather, a file system operation that writes to the metadata of the file system object, but not its content, is mutable and does not after m-time 125. Thus, in such scenarios, m-time 125 is not adequate for determining whether the mutable operation that was specified of the file system object at the source filer 30, was accurately implemented for the file system object at the destination filer 40.

Additionally, when mutable operations are in the process of being performed, but not completed, an inconsistency can arise in the m-time 125 of the file system object as between the source and destination filers. Specifically, the m-time 125 typically updates upon completion of a particular file system operation. As a result, the validation component 130 cannot rely entirely on m-time 125 to determine whether the migration is taken place because there still may be one or more pending operations on the particular file system object. In other words, the validation component 130 cannot determine whether the file system object is quiesced at the destination filer 40 as a result of operations being pending at the source filer 30 when the m-time 125 is checked. As described below, examples described herein utilize a semaphore component 120 to update a metadata item of individual file system objects after completion of one or more mutable operations on those file system objects. The validation component 130 can read the same metadata item from the file system object at the destination filer 40 in order to determine what the file system object is quiesced at the destination, and that no further pending mutable operations are in progress at the source filer 30.

In order to update a given metadata item of individual file system objects, and further use the metadata item for validation, the client system retrieves and modifies select metadata from file system objects at both the source filer 30 and the destination filer 40. In particular, aspects described herein provide for the client system 100 to access and write or update a unique or nonrepetitive item of the metadata 123 in order to facilitate validation by the validation component 130.

In one implementation, the client system 100 receives metadata 123 directly from both the source filer 30 and destination filer 40. For example, the client system 100 can be mounted to each of the source and destination filers 30, 40, in order to receive metadata 123 from the respective filer directly. Alternatively, the client system 100 can communicate with an intermediate component or system, such as migration system 20, in order to receive the metadata 123. By way of example, the file system component 110 can issue file system operations that are received by the migration system 20, and which query for metadata of specific file system objects residing on the source and destination filers. As described in greater detail, the validation component 130 uses the metadata 123 in order to verify that the file system objects that are to be validated at the destination filer 40 are quiesced. Once the file system objects are quiesced, the state of individual file system objects at the destination filer 40 can be validated as to whether the file system objects reflect performance of specified (or in-flight) mutable operations for the file system object at the source filer 30.

In one implementation, client system 100 accesses a group identifier ("GID") 113 of individual file system objects residing with the source filer 30. When the file system client 110 completes an operation, or alternatively, a set of operations, the semaphore component 120 operates to modify the GID 113. The modification to the GID 113 is then recorded in a file system operation log 121, which identifies the file system object in the updated GID 113 for the file system object. The update to the GID 113 can, for example, be iterated. By way of example, the semaphore component 120 can be prompted to iterate the GID 113 of a given file system object after a designated or known set of file system operations are performed on that file system object. As an alternative, the semaphore component 120 can use an alternative modification logic (to iteration) in order to modify the GID 113. Once modified, the updated GID 113 can be stored in the log 121.

As another variation, alternative metadata items can be selected for modification in conjunction with use of semaphore component 120. The alternative metadata items can include, for example, a user identifier (UID), permission set associated with the file system object, or size of the file system object. Furthermore, while an example of FIG. 1 illustrates components such as the validation component 130 and the log 121 residing with the client system 100, examples provide that some or all of the components of the client system 100 are shared between multiple nodes or devices of a common network. For example, the log 121 and/or validation component 130 can reside on different machines as compared to the file system client 110 and semaphore component 120.

According to an aspect, the client system 100 is able to specify a mutable operation on a particular file system object, and responsive to issuing the file system operation, verify that the file system object is the same at both the source filer 30 and the destination filer 40. In other words, the client system 100 can verify that the mutable operation specified on the file system object at the source filer 30 is carried through to the destination filer 40, so that the file system object is the same at both the source and destination. In implementation, the file system client 110 can identify a file system object, query the source filer 30 for its metadata, and specify a mutable file system operation for that object. The semaphore component 120 can specify an operation to write a particular metadata item (e.g., GID) of the specified file system object. By way of example, the semaphore component 120 can iterate or otherwise increment the GID of the specified file system object. The semaphore component 120 can store the update to the particular file system objects metadata item (e.g., using a local store). The validation component 130 can query the destination filer 40 for the metadata of the file system object, and then compare the semaphore from the metadata of the file system object at the destination filer 40 with a most recent semaphore value stored for that file system object. If the comparison yields a matching semaphore value, then the validation component 130 determines that the file system object is quiesced at the destination filer 40. Once quiesced, the validation component 130 can validate the migration and the implementation of the mutable file system operation for the file system object at the destination filer 40.

In one implementation, the client system 100 is able to issue mutable file system operations on a file system object, and responsively determine, from the comparison of the semaphore values, that the file system operations were implemented on the destination filer 40. In a variation, the client system 100 can operate to issue mutable file system operations, and store semaphore updates for each of the file system objects that are specified by the mutable operations. After a given duration of time, the validation component 130 can query the destination filer 40 for metadata of the specified file system objects, and further compare the semaphore of each file system object at the destination with the semaphore update that is stored for that object in order to determine the file system objects that are quiesced at the destination filer 40.

Methodology

Figure 2:
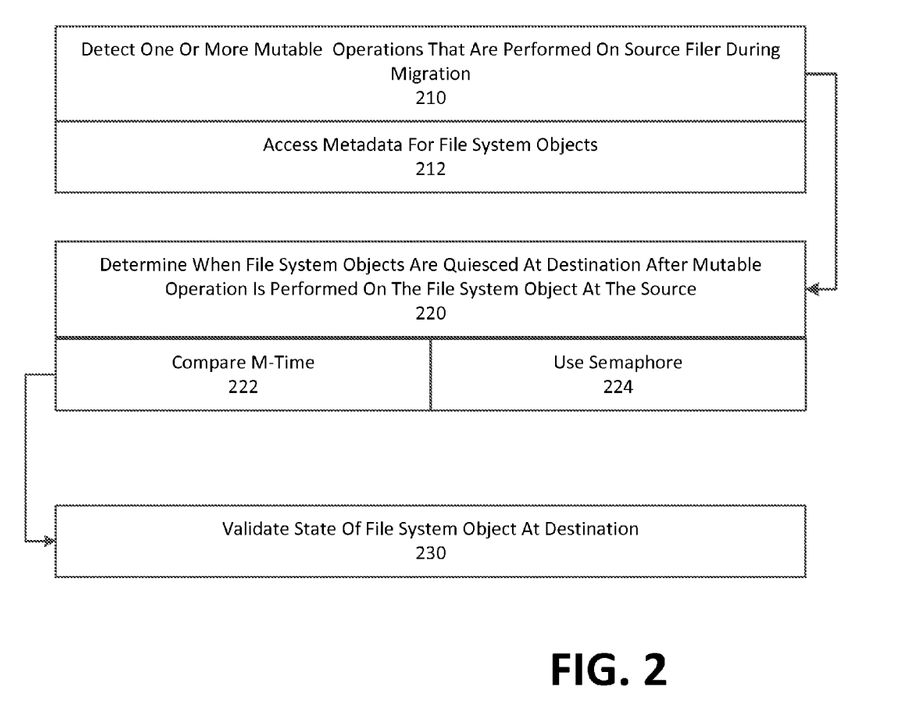
FIG. 2 illustrates an example method for validating a file system object that is subjected to a mutable operation by a client system during a migration, according to one aspect.

FIG. 2 illustrates an example method for validating a file system object that is subjected to a mutable operation by a client system during a migration by using a semaphore for determining that the file system object is quiesced and valid after a mutable operation has been performed on the file system object during a migration. An example such as provided by FIG. 2 can be implemented using an implementation system such as described with an example of FIG. 1. Accordingly, reference may be made to elements of FIG. 1 for purpose of illustrating a suitable component for performing a step or sub step being described.

With reference to FIG. 2, one or more file system operations are specified by a client computer for performance on a source filer during a migration (210). The client computer can query the metadata of the specified file system object prior to issuing the operation (212). In one implementation, the client computer obtains the metadata for some or all of the file system objects of the source filer 30 prior to issuing file system operations on those objects. In a variation, the client computer obtains the metadata for a file system object of interest prior to issuing a mutable operation on that file system object. The metadata that is obtained from querying the file system object(s) includes a unique or non-repeating metadata item such as the GID which can be used as a semaphore. Furthermore, when the file system operation is specified on a given object, the uniqueness of the semaphore is maintained by logic that iterates or otherwise modifies the metadata item of the semaphore in a predetermined manner (e.g., iteration).

The client computer 100 can determine when file system objects are quiesced at the destination after a mutable operation is performed on those file system objects at the source filer (220). The file system objects may be considered quiesced if they are not undergoing change. In determining when the file system objects are quiesced, the client computer can use metadata items that include the m-time 125 (222). Additionally, one or more additional metadata items can be used as a semaphore (224) (e.g., GID). For example, those file system operations that have not been subjected to mutable file system operations may be considered as being quiesced at the destination filer 40 if the m-time of the file is the same at the source and destination.

Still further, those file system operations that have been subjected to a mutable file system operation at the source filer 30 may be considered quiesced at the destination filer 40 if the semaphore of the file system object has the same state at the source and destination. The validation component 130 can, for example, compare the semaphore of the file system object at the source filer 30 to the semaphore at the destination filer 40 in order to determine whether the file system object has the same state after the mutable operation is specified. For example, the client computer can include the semaphore component 120, which writes or otherwise updates a metadata item (e.g., GID) after a particular file system operation or set of operations is specified for the file system object at the source filer 30.

Once the file system object is determined to be quiesced at the destination, the state of the file system object can be validated (230). In particular, the file system operation can be validated after one or more mutable operations are performed on the file system object at the source filer 30. In this way, the validation reflects, for example, that the migration system 20 conveyed or otherwise accurately reflected the state of the file system object (e.g., both content and metadata) at the destination filer 40 after performance of the mutable operation on the file system object at the source filer 30.

Figure 3:
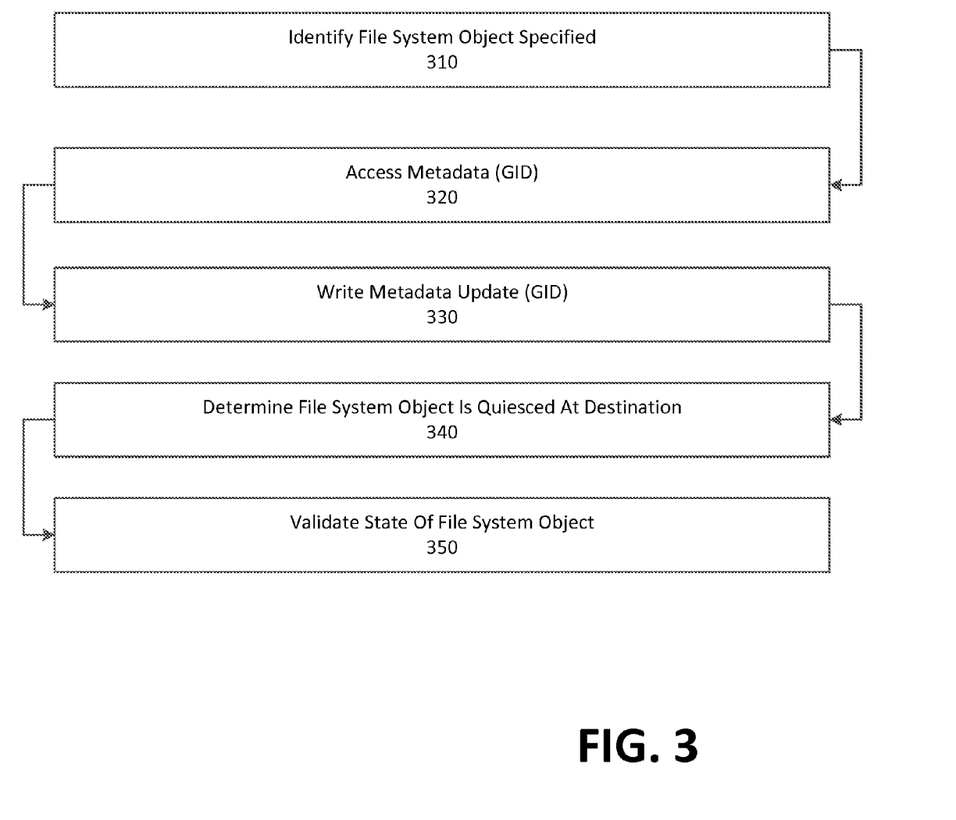
FIG. 3 illustrates an example method for using a semaphore for determining that a file system object is quiesced and valid after a mutable operation is applied to a file system object during a migration, according to another aspect.

With reference to FIG. 3, a set of file system objects of the source filer 30 are identified (310), and metadata (e.g., GID) for the file system objects are determined from the client system (320). For example, the file system client 110 can issue one or more NFS commands to obtain the metadata for each of the file system objects. In one implementation, multiple file system objects of the source filer 30 are pre-identified and the metadata for each of the identified file system objects are determined in advance of file system operations being composed and issued from the client system 100 for those file system objects. In a variation, the identification of file system objects and the determination of the metadata for the file system objects is made on-the-fly, in response to file system operation being specified from the client system 100.

Once a file system operation is specified for a given file system object, a select metadata item of that file system object can be written from the client system 100 in order to reflect issuance of the mutable operation (330). By way of example, the client computer 100 can issue a CHOWN or similar type of operation to change the GID (or UID, file size, etc.) of the specified file system operation in accordance with the predetermined logic (e.g., increment or iteration).

Subsequently, the client system can determine whether the file system object that received the mutable operation at the source is quiesced at the destination filer 40 (340). The file system object can be quiesced if it is not in a state of being changed. In the implementation system 10 of FIG. 1, the migration system 20 can replicate the metadata of the file system object at the source filer 30 on the destination filer 40 at a given instance when replication takes place. Thus, for example, the client system 100 can increment the GID of the file system objects after specifying a set of file system operations for that object, and the migration system 20 will inherently replicate the changed GID at the destination filer 40. However, if the file system object at the source filer 30 is in a state of change, as a result of, for example, one or more file system operations being queued or otherwise in progress on the file system operation, then the destination filer will not reflect the changed GID (or metadata item). In this way, the determination as to whether a particular file system object is quiesced at the destination depends on whether the GID (or other metadata item) of the file system object at the destination is the same as the metadata of the file system object at the source filer 30.

Once the file system object is determined to be quiesced, the state of the file system object can be validated (350). In particular, a comparison of the file system object at the source and destination can be made, in order to determine whether the state of the file system object at the destination matches that of the file system object at the source. If the state of the file system object is validated, then the migration, including the conveyance of the mutable operation specified for the source filer 30, is deemed successful for the particular file system object at the particular time.

Computer System

Figure 4:
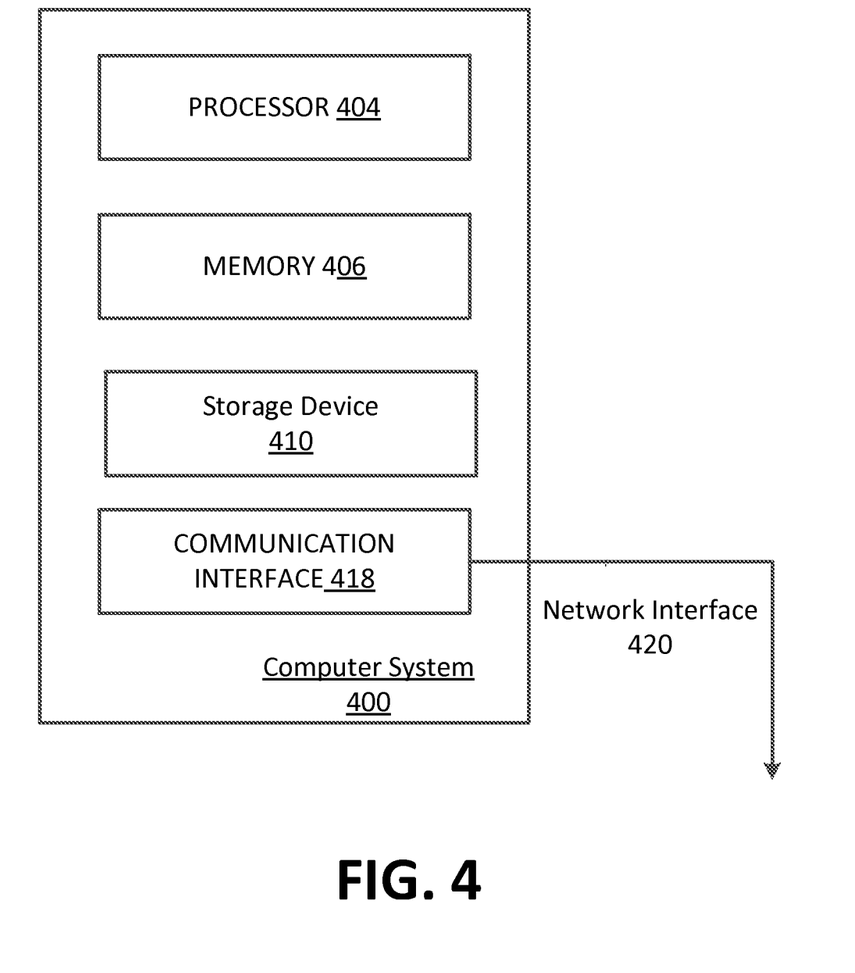
FIG. 4 is a block diagram that illustrates a computer system upon which embodiments described herein may be implemented.

FIG. 4 is a block diagram that illustrates a computer system upon which embodiments described herein may be implemented. For example, in the context of FIG. 1, system 100 may be implemented using one or more computer systems such as described by FIG. 4. Still further, methods such as described with FIG. 2 and FIG. 3 can be implemented using a computer such as described with an example of FIG. 4.

In an embodiment, computer system 400 includes processor 404, memory 406 (including non-transitory memory), storage device 410, and communication interface 418. Computer system 400 includes at least one processor 404 for processing information. Computer system 400 also includes a memory 406, such as a random access memory (RAM) or other dynamic storage device, for storing information and instructions to be executed by processor 404. The memory 406 also may be used for storing temporary variables or other intermediate information during execution of instructions to be executed by processor 404. Computer system 400 may also include a read only memory (ROM) or other static storage device for storing static information and instructions for processor 404. A storage device 410, such as a magnetic disk or optical disk, is provided for storing information and instructions. The communication interface 418 may enable the computer system 400 to communicate with one or more networks through use of the network link 420 (wireless or wireline).

In one implementation, memory 406 may store instructions for implementing functionality such as described with an example of FIG. 1, or implemented through an example method such as described with FIG. 2 and FIG. 3. Likewise, the processor 404 may execute the instructions in providing functionality as described with FIG. 1, or performing operations as described with an example method of FIG. 2 and FIG. 3.

Embodiments described herein are related to the use of computer system 400 for implementing the techniques described herein. According to one embodiment, those techniques are performed by computer system 400 in response to processor 404 executing one or more sequences of one or more instructions contained in the memory 406. Such instructions may be read into memory 406 from another machine-readable medium, such as storage device 410. Execution of the sequences of instructions contained in memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium that stores instructions that, when executed by one or more processors of a computer system, cause the computer system to perform operations that comprise:
   (a) issuing one or more file system operations that are to be performed on each of multiple system objects of a file system data set at a source while the file system data set is migrated from the source to a destination, wherein the one or more file system operations for each of the multiple file system objects include one or more mutable operations which update at least one of a data or a metadata component of a specified file system object of the file system data set at the source;
   (b) determining when each of the multiple file system objects is quiesced after the one or more mutable operation is performed on that file system object at the source; and
   (c) for each file system object that is determined to be quiesced, validating that a state of the file system object at the destination replicates performance of the one or more mutable operations that are performed for the file system object at the source.

2. The non-transitory computer-readable medium of claim 1, wherein determining when each of the multiple file system objects is quiesced at the destination includes determining whether any mutable file system operation is pending or in progress for that file system object at the source.

3. The non-transitory computer-readable medium of claim 1, further comprising instructions that, when executed by the one or more processors, cause the one or more processors to perform operations comprising:
   for each file system object, (i) updating a metadata item of the file system object from a client system upon completion of the one or more mutable operations, and (ii) recording the updated metadata item in association with the file system object.

4. The non-transitory computer-readable medium of claim 3, wherein determining when each of the multiple file system objects is quiesced includes determining whether metadata item of the file system object at the destination after completion of the one or more mutable operations is equivalent to the updated metadata item that is recorded in association with the file system object.

5. The non-transitory computer-readable medium of claim 3, wherein determining when each of the multiple file system objects is quiesced at the destination is based at least in part on the updated metadata item.

6. The non-transitory computer-readable medium of claim 3, wherein updating the metadata item is based on a predetermined logic to alter the metadata item in response to completion of the one or more file system operations.

7. The non-transitory computer-readable medium of claim 6, wherein the metadata item for each of the multiple file system objects corresponds to one or more of a user identifier (UID) for the file system object, group identifier (GID) for the file system object, a size of the file system object or a set of permissions for the file system object.

8. The non-transitory computer-readable medium of claim 1, wherein (a) through (c) are performed on a client system that generates at least some of the one or more mutable operations for each of the multiple file system objects.

9. The non-transitory computer-readable medium of claim 1, wherein validating that the file system object at the destination replicates performance of the one or more mutable operations includes comparing a state of each file system object that is determined to be quiesced at the destination to a corresponding state of the file system object at the source.

10. The non-transitory computer-readable medium of claim 9, wherein comparing the state of each file system object that is determined to be quiesced at the destination to the corresponding state of the file system object at the source includes comparing one or more of a content or metadata of the file system object at each of the source and destination.

11. A method for validating replication of mutable operations on file system objects during migration, the method being implemented by one or more processors and comprising:
  (a) issue one or more file system operations that are to be performed on each of multiple system objects of a file system data set at a source while the file system data set is migrated from the source to a destination, wherein the one or more file system operations for each of the multiple file system objects include one or more mutable operations which update at least one of a data or a metadata component of a specified file system object of the file system data set at the source;
  (b) determining when each of the multiple file system objects is quiesced after the one or more mutable operation is performed on that file system object at the source; and
  (c) for each file system object that is determined to be quiesced, validating that the file system object at the destination replicates performance of the one or more mutable operations that are performed for the file system object at the source.

12. The method of claim 11, wherein determining when each of the multiple file system objects is quiesced at the destination includes determining whether any mutable file system operation is pending or in progress for that file system object at the source.

13. The method of claim 11, further comprising:
  for each file system object, (i) updating a metadata item of the file system object from a client system upon completion of the one or more mutable operations, and (ii) recording the updated metadata item in association with the file system object.

14. The method of claim 13, wherein determining when each of the multiple file system objects is quiesced includes determining whether metadata item of the file system object at the destination after completion of the one or more mutable operations is equivalent to the updated metadata item that is recorded in association with the file system object.

15. The method of claim 13, wherein determining when each of the multiple file system objects is quiesced at the destination is based at least in part on the updated metadata item.

16. The method of claim 13, wherein updating the metadata item is based on a predetermined logic to alter the metadata item in response to completion of the one or more file system operations.

17. The method of claim 16, wherein the metadata item for each of the multiple file system objects corresponds to one or more of a user identifier (UID) for the file system object, group identifier (GID) for the file system object, a size of the file system object or a set of permissions for the file system object.

18. The method of claim 11, wherein (a) through (c) are performed on a client system that generates at least some of the one or more mutable file system operations for each of the multiple file system objects.

19. The method of claim 11, wherein validating that the file system object at the destination replicates performance of the one or more mutable operations includes comparing a state of each file system object that is determined to be quiesced at the destination to a corresponding state of the file system object at the source.

20. A computer system comprising:
  a memory that stores a set of instructions;
  one or more processors that use the set of instructions to:
    (a) issue one or more file system operations that are to be performed on each of multiple system objects of a file system data set at a source while the file system data set is migrated from the source to a destination, wherein the one or more file system operations for each of the multiple file system objects include one or more mutable operations which update at least at least one of a data or a metadata component of a specified file system object of the file system data set at the source;
    (b) determine when each of the multiple file system objects is quiesced after the one or more mutable operation is performed on that file system object at the source; and
    (c) for each file system object that is determined to be quiesced, validate that the file system object at the destination replicates performance of the one or more mutable operations that are performed for the file system object at the source.

* * * * *